March 2, 1943.   J. G. BOWER   2,312,383
RAILWAY CAR TRUCK
Original Filed Feb. 18, 1938    3 Sheets-Sheet 1
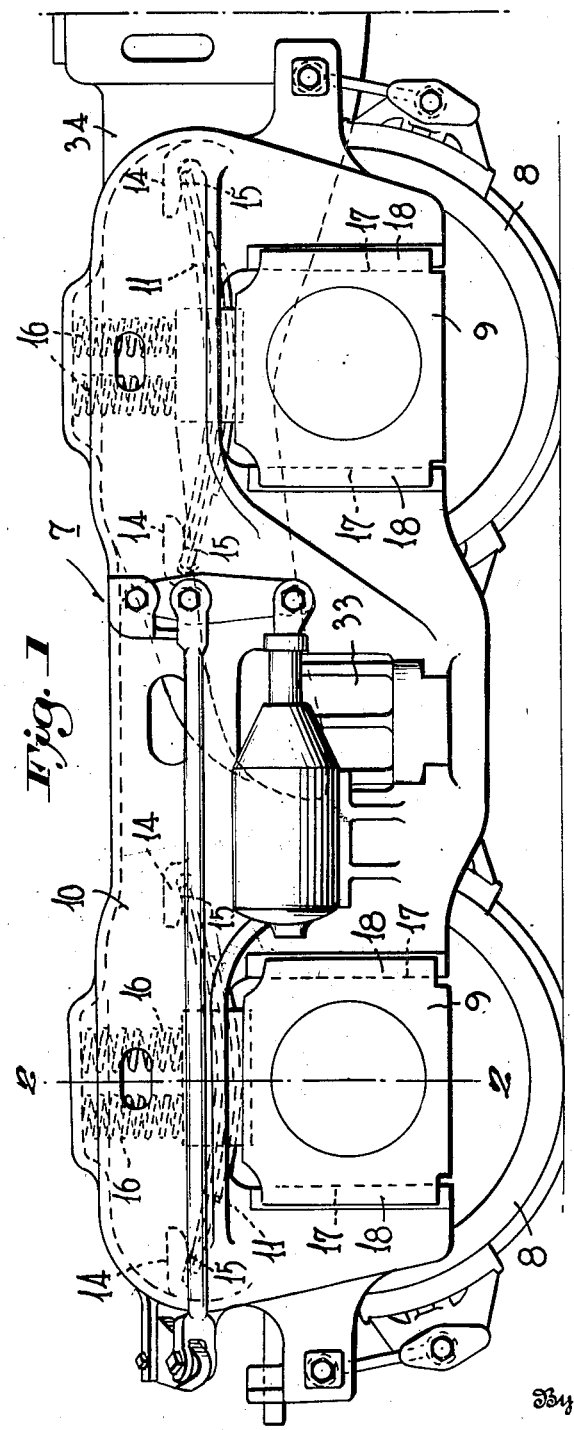
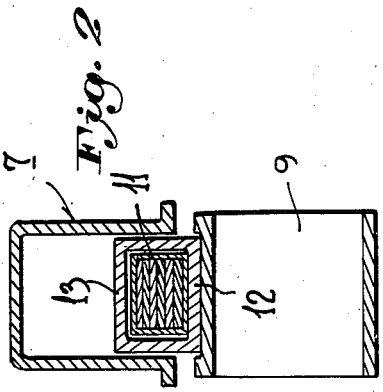
Inventor
J. G. Bower,
By Seymour, Bright + Nottingham
Attorneys March 2, 1943.   J. G. BOWER   2,312,383
RAILWAY CAR TRUCK
Original Filed Feb. 18, 1938   3 Sheets-Sheet 2
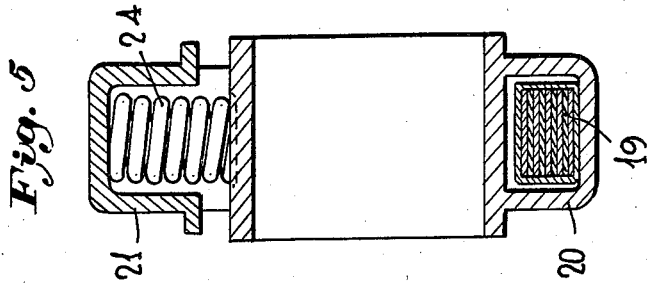
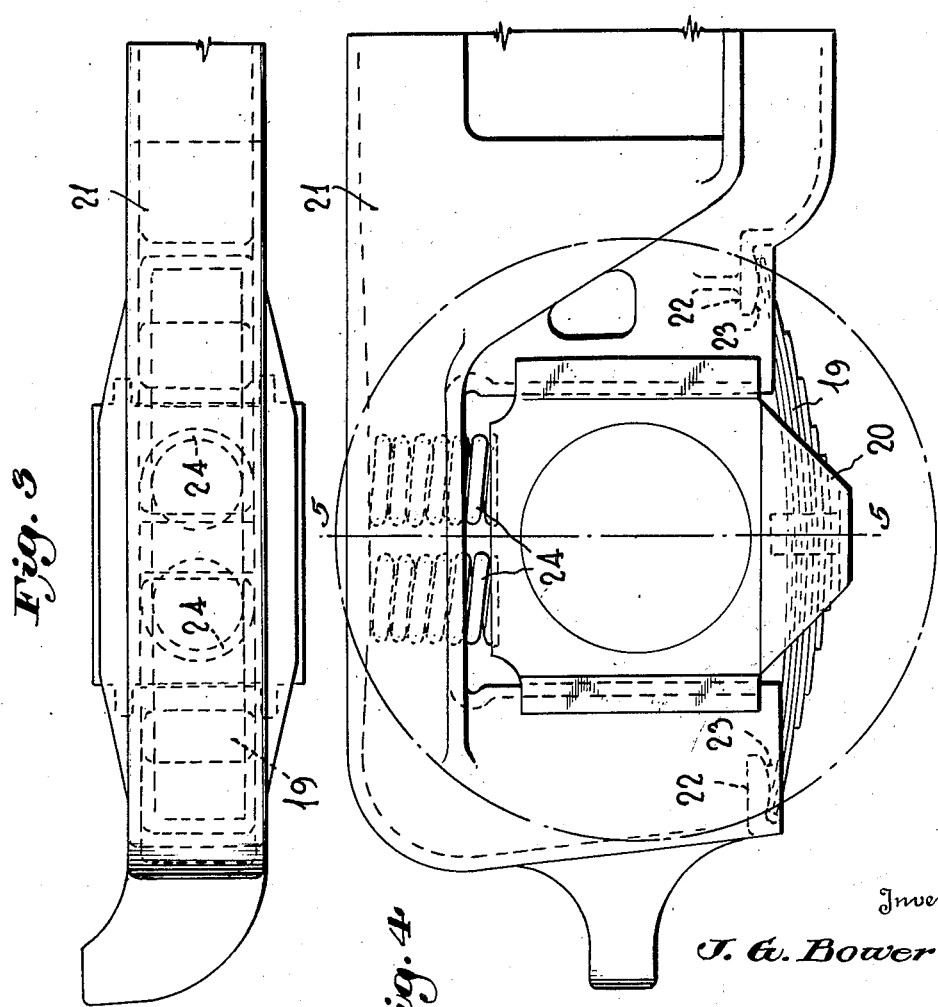
Inventor
J. G. Bower,
By Seymour, Bright + Nottingham
Attorneys

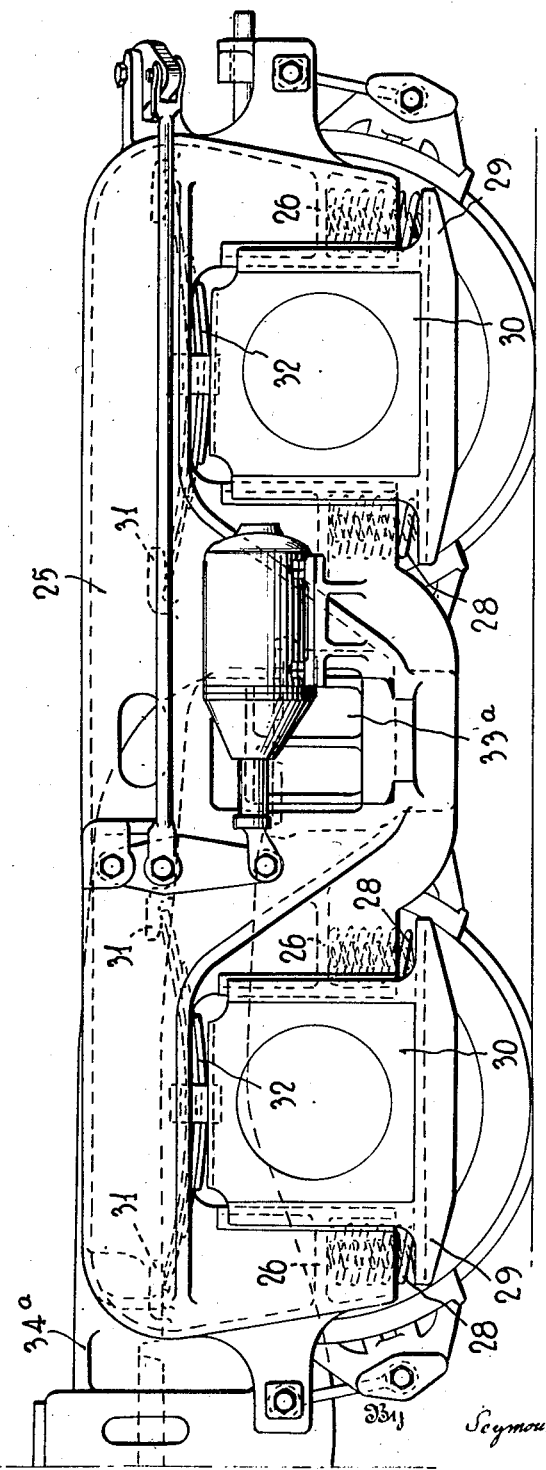

Patented Mar. 2, 1943

2,312,383

UNITED STATES PATENT OFFICE 2,312,383

RAILWAY CAR TRUCK

Jerome G. Bower, New York, N. Y., assignor to The Buckeye Steel Castings Company, Columbus, Ohio Original application February 18, 1938, Serial No. 191,308, now Patent No. 2,224,136, dated December 10, 1940. Divided and this application October 30, 1940, Serial No. 363,533

2 Claims. (Cl. 105—183)

This invention relates to improvements in railway car trucks and while it is applicable to trucks having four or more wheels, it is particularly useful in connection with eight-wheel trucks.

The present application is a division of my application, Serial No. 191,308, filed February 18, 1938, which has since matured into Patent 2,224,136, granted December 10, 1940.

At the present time, heavy equipment and high train speeds make it desirable to decrease the load concentrations at the wheels, and this situation has led to the development of trucks using more wheels and axles per truck. Lighter wheel loads result in greater economy and efficiency due to the reduced maintenance cost, especially in high speed service.

The primary purpose of the present invention is to provide novel means for mounting the side frames on the journal boxes of the truck.

The invention aims to devise a structure of this character in which former objections are overcome, and is particularly directed to simplifying constructions of this kind and to produce a compact, efficient and thoroughly practical truck.

A further object is to supply a truck which is relatively short in height.

Other objects and advantages which are inherent in the invention will become apparent from a detailed description of the invention in connection with the accompanying drawings, in which:

Fig. 1 is a side elevation of one half of a truck of the type disclosed in my above-mentioned parent application, Serial No. 191,308.

Fig. 2 is a transverse sectional view of a detail taken on the line 2—2 of Fig. 1.

Fig. 3 is a top plan view of a portion of a modification in which a side frame is resiliently supported by a journal box in a different manner than shown in Figs. 1 and 2.

Fig. 4 is a side elevation of the structure illustrated in Fig. 3.

Fig. 5 is a transverse sectional view taken on the line 5—5 of Fig. 4.

Fig. 6 is a side elevation of a further modification in which each side frame member is resiliently supported by journal boxes in a novel way.

Referring first to Figs. 1 and 2, 7 designates a four-wheel truck unit forming part of an eight-wheel truck. In accordance with the invention, each of such units may consist of four wheels 8, supporting axles (not shown) which carry journal boxes 9. The journal boxes, in turn support side frames 10 at each side of the truck, only one of which is shown.

Each side frame is resiliently mounted on a pair of journal boxes, and in the construction shown in Figs. 1 and 2, semi-elliptic springs 11 are supported upon seats 12 upon the tops of the journal boxes, and each seat may consist of a rectangular, tubular casting 13 through which the spring extends. The ends of the springs underlie supports 14, which may be integral with or secured to the side frame, and each support preferably has an arc-shaped bottom surface 15 for transferring a portion of the load from the vehicle through the spring to the journal box. Helical springs 16 of any suitable number rest on the tubular bearing castings 13, and extend vertically into the side frame member above the pedestal openings 17 to also aid in supporting the side frame. Obviously the side frames should preferably be hollow castings in order to take care of such constructions. Each journal box is slidably mounted for vertical movement within a pedestal opening and is provided with flanges 18 which embrace the vertical portions at the sides of the pedestal opening, thereby guiding the journal box within the opening. Although Fig. 1 shows two helical springs over each journal box, it is manifest that the design is readily applicable for the use of one or more helical springs.

In the modification shown in Figs. 3 to 5 inclusive, each semi-elliptic spring 19 instead of being arranged at the top of a journal box is positioned below the same, and accordingly the bottom of each journal box is provided with a cradle 20 preferably cast integral with the box. The side frame member 21 in this assembly, is also provided with supports 22 with arc-shaped bottom portions 23 which bear upon opposite ends of the semi-elliptic spring thereby transferring a portion of the load from the vehicle through this spring to the axle journal. The helical springs 24 in this modification are seated directly on top of the journal boxes.

In the embodiment of the invention illustrated in Fig. 6, another type of spring suspension is used. In this construction, each side frame member 25 is provided with bearing portions or shelves 26, which are arranged at opposite sides of the pedestal opening and rest upon a suitable number of coil springs 28 supported on oppositely extending seats 29 cast integral with the journal boxes 30. The side frame member 25 is also provided with fixed supports 31 having arc-shaped bottom portions resting upon the opposite ends of semi-elliptic springs 32 supported on the top of the journal boxes. Each journal box is slidably mounted within a pedestal opening of the side frame.

When springs are provided at the pedestal openings of the side frame member as described above, it is unnecessary to provide resilient mountings between the transverse bolsters (33 in Fig. 1, and 33a in Fig. 6), and the side frames, and obviously this permits the transverse bolsters to be arranged lower than would be the case if they were supported directly by springs.

As in my parent application, the transverse bolsters of a plurality of four-wheel units may support a span bolster (34 in Fig. 1, and 34a in Fig. 6).

From the foregoing it is believed the details of the improved truck as well as the advantages of the present invention may be readily understood, and it will be obvious that the invention is not limited to the details of the illustrative constructions since these may be variously modified. Moreover, it is not indispensable that all features of the invention be used conjointly, since various features may be employed to advantage in different combinations and sub-combinations without departing from the spirit of the invention as expressed in the claims.

What I claim and desire to secure by Letters Patent is:

1. In a railway car truck, wheel supported axles, boxes in which the axles are journaled, a rigid side frame member having its end portions vertically slidable on the journal boxes, spring means supporting the side frame member on the journal boxes, said side frame member having a window arranged midway between the journal boxes, and bolster means having an end portion extending into said window, resting on the side frame member, and vertically movable in unison with the side frame member, said spring means including tubular members arranged at the tops of the journal boxes and each being immovable transversely and longitudinally relatively to the journal box with which it is associated, semi-elliptic springs extending through the tubular members, supports fixedly arranged within the side frame member and resting on the ends of the semi-elliptic springs, and coil springs resting on top of the tubular members and supporting the side frame member.

2. In a railway car truck of the type having wheel supported axle journal boxes, a rigid side frame member having a window about midway between its ends and having its end portions vertically slidable on the journal boxes, bolster means having an end portion extending into said window, resting on the side frame member and vertically movable in unison with said side frame member, and spring means supporting the side frame member on the journal boxes, the improvement in which the spring means comprises tubular members connected to the journal boxes and each arranged immovably transversely and longitudinally relatively to the journal box with which it is associated, semi-elliptic springs extending through the tubular members, supports fixedly arranged within the side frame member and resting on the ends of the semi-elliptic springs, and coil springs supported at the top of the journal boxes and supporting the side frame member, the side frame member immediately above the journal boxes being of inverted U-shaped cross section and housing said coil springs.

JEROME G. BOWER.